Figure 1:
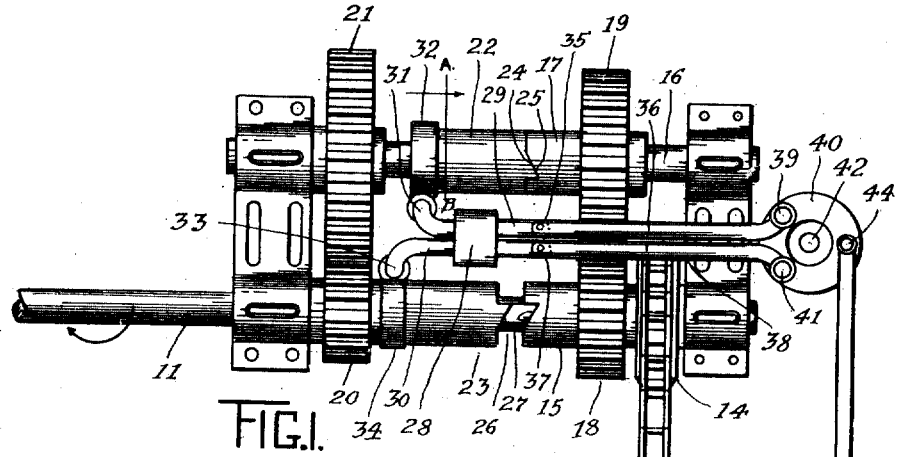

A. ANDERSON.
CHANGE SPEED MECHANISM.
APPLICATION FILED JULY 27, 1914.

1,228,087.

Patented May 29, 1917.

WITNESSES:

INVENTOR.
Andrew Anderson.
BY
ATTORNEYS

UNITED STATES PATENT OFFICE.

ANDREW ANDERSON, OF BIGFORK, MINNESOTA, ASSIGNOR OF ONE-HALF TO T. M. SAUNDERS, OF BIGFORK, MINNESOTA.

CHANGE-SPEED MECHANISM.

1,228,087. Specification of Letters Patent. Patented May 29, 1917.

Application filed July 27, 1914. Serial No. 853,270.

*To all whom it may concern:*

Be it known that I, ANDREW ANDERSON, a citizen of the United States, residing at Bigfork, in the county of Itasca and State of Minnesota, have invented certain new and useful Improvements in Change - Speed Mechanism, of which the following is a specification.

My invention relates to change- speed mechanism for driving harvesters or twine binders and has for its object to provide a transmission from the bull wheel of a harvester and a clutch control therefor which will enable the mechanism of the harvester to be driven at either of two speeds or to be held in neutral position, as desired.

The full objects and advantages of my invention will appear in connection with the detailed description thereof and are particularly pointed out in the claims.

In the drawings, illustrating the application of my invention in one form,—

Figure 2:
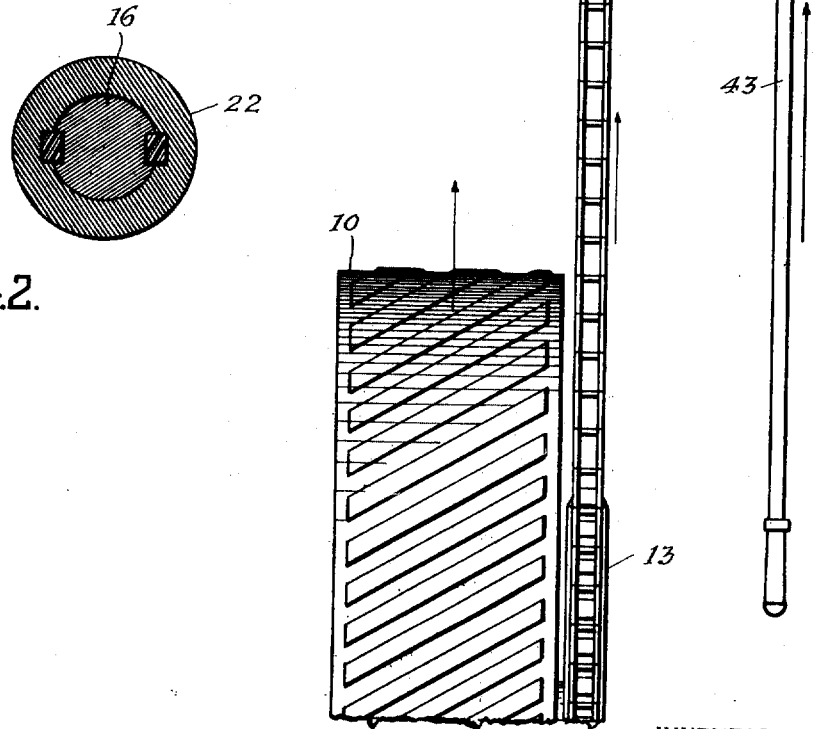

Figure 1 is a plan view of my mechanism showing the manner of applying the same in a binder mechanism or similar device. Fig. 2 is an enlarged section on line A.

As illustrated, the bull wheel 10 of the binder is put in driving relation with the drive shaft 11 by means of a sprocket chain 12 running over a sprocket wheel 13 fast with the bull wheel 10, and a sprocket wheel 14 fast on a sleeve 15 which is freely rotatable upon shaft 11. Journaled adjacent shaft 11 is a counter shaft 16 upon which is mounted for free rotation a sleeve 17 corresponding to sleeve 15. A spur gear 18 on sleeve 15 meshes with a spur gear 19 on sleeve 17, so that sleeves 15 and 17 are always constantly driven whenever the machine is moving so that bull wheel 10 is caused to rotate. Fast on shaft 11, at a spaced distance from the end of sleeve 15 is a pinion or spur gear 20 of smaller diameter than spur gear 18 on sleeve 15. Spur gear 20 meshes with a spur gear 21 fast on counter shaft 16, which gear 21 is correspondingly larger than gear 19 and is spaced from sleeve 17 to the same extent as gear 20 is spaced from sleeve 15. Slidable in the space between sleeve 17 and gear 21, upon shaft 16, is a clutch sleeve 22 which is splined to shaft 16, as clearly shown in Fig. 2. A similar clutch sleeve 23 is splined to drive shaft 11 and slidable along the same in the space between gear 20 and the end of sleeve 15.

The sleeve 22 is provided with a clutch face 24 engageable with a similar clutch face 25 on sleeve 17, and the sleeve 23 is provided with a clutch face 26 engageable with a similar clutch face 27 on sleeve 15. From the following, it is apparent that when neither sliding sleeve 22 nor 23 has its clutch face in engagement with the coöperating clutch face on sleeve 17 or 15, respectively, gears 18 and 19 will turn freely upon shafts 11 and 16 and no driving result take place. If, however, sleeve 23 has the clutch face 22 thereof brought into coöperative engagement with clutch face 27, clutch sleeve 22 meanwhile being inoperative, it is apparent that shaft 11 will be connected and driven directly from the sprocket wheel 14 on sleeve 15, gear 19 meanwhile turning upon shaft 16 which itself is driven idly in reverse direction through gear 21. When, however, the clutch face 24 on sleeve 22 is caused to engage clutch face 25 on sleeve 17, clutch sleeve 23 meanwhile being inoperative, it will be seen that through gear 19 and clutch 22 counter shaft 16 will be driven, and with it gear 21, which through gear 20 on shaft 11 will rotate shaft 11 in the same direction as if directly driven from sprocket wheel 14, and at increased speed.

Means for controlling the sleeves 22 and 23 so that whichever one may be selected will be operatively connected with its coöperating sleeve and the other correspondingly disconnected, will now be described. A stand 28 is located between sleeves 22 and 23 and has therein a pair of guide openings in which slide two rods 29 and 30. Rod 29 is pivotally connected at 31 with a collar 32 on sleeve 22, and rod 30 is connected at 33 with a collar 34 on sleeve 23. The rod 29 is pivoted at 35 to a link 36, and the rod 30 is pivoted at 37 to a link 38. Link 36 is pivotally connected at 39 to a disk 40, and link 38 is similarly connected at 41 to disk 40. Disk 40 is journaled for rotation or oscillation upon a standard 42 secured to a fixed part of the frame. A link 43 is pivotally connected at 44 to disk 40. The link 43 is operated by a hand lever connected therewith which is positioned adjacent the seat of the driver or operator of the machine.

It will be apparent that in one position of link 43 and disk 40 the rods 29 and 30 will move the sleeves 22 and 23 into a neutral or balanced position in which the clutch faces 24 and 26 of said sleeves will be out of coöperative relation with the clutch faces 25 and 27 on sleeves 17 and 15. A movement of the disk in one direction from the neutral position will bring clutch face 26 on sleeve 23 into operative engagement with clutch face 27 on sleeve 15 for direct drive of shaft 11. Similarly, a movement of disk 40 in the opposite direction will bring clutch face 24 on sleeve 22 into coöperative engagement with clutch face 25 on sleeve 17 for driving the shaft 11 at increased speed. A single lever controls these two sets of coöperating clutches in the manner described, and it will be clear that the operation of the respective sets of clutches is alternative and cannot be conjoined.

It thus is apparent that I have provided for an ordinary binder a double speed mechanism whereby the cutting and binding apparatus may be driven at a greater or less speed in proportion to the movement of the binder over the ground and in accordance with the character of the grain which is being harvested. There is a direct connection between such a two-speed drive and a traction driving member such as a bull wheel, because of the fact that the rate of movement of the bull wheel is proportional to the distance of travel of the machine over the ground. Thus, if the grain is proportionately heavy, so that the number of bundles to be harvested and bound for a given distance of travel is relatively large, much more efficient results may be obtained by increasing the speed of drive of the harvesting and binding mechanism in proportion to the speed of travel of the machine. On the other hand, when the grain is relatively light and, therefore, the team can be driven at a comparatively rapid rate (much more so than would be possible in heavy grain), this desired result may be materially aided by driving the harvesting and binding mechanism at a relatively slower speed in proportion to the distance traveled by the machine. These highly beneficial results are easily and efficiently accomplished by the application of my mechanism in connection with a binder or harvester.

I claim:

1. In combination with the bull wheel and drive shaft of a grain harvester, a sleeve loose on said shaft driven from the bull wheel, means for connecting said sleeves directly to rotate the shaft therewith at the speed thereof, other means for rotating said shaft indirectly from said sleeve at another speed, and means under the control of the operator for making either connection at will.

2. In combination with the bull wheel and drive shaft of a grain harvester, a sleeve loose on said shaft driven from the bull wheel, a counter shaft, means thereon operatively connected with the drive shaft to rotate the same at a different speed from that of the sleeve, a sleeve loose on the counter shaft constantly driven from the first named sleeve, and means under the control of the operator to connect the drive shaft to rotate with the sleeve on said drive shaft or to connect the counter shaft to rotate with the sleeve thereon.

3. In combination with the bull wheel and drive shaft of a grain harvester, a sleeve loose on said shaft driven from the bull wheel, a counter shaft, means thereon operatively connected with the drive shaft to rotate the same at a different speed from that of the sleeve, a sleeve loose on the counter shaft constantly driven from the first named sleeve, an independent clutch member slidable on each of said shafts to connect the drive shaft or the counter shaft to rotate with its sleeve, a separate slidable rod connected with each of said clutch members, and means under the control of the operator simultaneously to slide said rods in opposite directions to render one or the other of said clutch members operative at will.

4. In combination with the bull wheel and drive shaft of a grain harvester, a sleeve loose on said shaft driven from the bull wheel, a counter shaft, means thereon operatively connected with the drive shaft to rotate the same at a different speed from that of the sleeve, a sleeve loose on the counter shaft constantly driven from the first named sleeve, an independent clutch member slidable on each of said shafts to connect the drive shaft or the counter shaft to rotate with its sleeve, a separate slidable rod connected with each of said clutch members, an oscillating disk, links pivotally connecting said rods with said disk, and means to oscillate said disk in either direction to cause said rods to slide in opposite directions and render one or the other of said clutch members operative at will.

In testimony whereof I affix my signature in presence of two witnesses.

ANDREW ANDERSON.

Witnesses:
  PETER EVENSEN,
  C. C. HOLSMAN.